United States Patent [19]
Zeeh et al.

[11] 3,905,798
[45] Sept. 16, 1975

[54] PLANT GROWTH REGULATORS

[75] Inventors: Bernd Zeeh, Ludwigshafen; Johann Jung, Limburgerhof; Costin Rentzea, Heidelberg; Karl-Heinz Koenig, Frankenthal, all of Germany

[73] Assignee: Badische Anilin- & Soda-Fabrik Aktiengesellschaft, Ludwigshafen (Rhine), Germany

[22] Filed: Feb. 1, 1973

[21] Appl. No.: 328,645

[30] Foreign Application Priority Data
Feb. 18, 1972 Germany.............................. 2207575

[52] U.S. Cl. ............................ 71/76; 71/92; 71/94; 71/95
[51] Int. Cl.² ........................................... A01N 9/14
[58] Field of Search ................ 71/94, 95, 92, 76, 78

[56] References Cited
UNITED STATES PATENTS

| | | | |
|---|---|---|---|
| 3,402,039 | 9/1968 | Mussell et al. | 71/76 |
| 3,736,121 | 5/1973 | Zeeh et al. | 71/76 |
| 3,802,862 | 4/1974 | Bidlack | 71/94 |
| 3,804,612 | 4/1974 | Hedrich | 71/94 |

OTHER PUBLICATIONS

Renshaw et al., J. Am. Chem. Soc., 60, 745 (1938).
ibid. 61, 638 (1939).
Saunders et al., J. Am. Chem. Soc., 88, 3376 (1966).

*Primary Examiner*—James O. Thomas, Jr.
*Attorney, Agent, or Firm*—Johnston, Keil, Thompson & Shurtleff

[57] ABSTRACT

New and valuable agents containing nitrogenous salts for regulating plant growth.

2 Claims, No Drawings

PLANT GROWTH REGULATORS

The present invention relates to agents for regulating plant growth which contain as active ingredients salts of cyclic nitrogenous compounds, and the use of these salts for controlling plant growth.

It is known to use nitrogenous compounds such as chlorocholine chloride (CCC) (J. Biol. Chem., 235, 475, 1960) and 1-(β-chloroethyl)-1,1-dimethylhydrazinium chloride (CMH) (Naturwissenschaften, 55, 217, 1968) for influencing the growth of plants. These compounds have an effect on the physiology of plant growth and may therefore be employed as plant growth regulators.

One of the typical effects of plant growth regulators is a reduction in plant height. Similarly, seed germination may be stimulated or flowering induced, i.e., it is possible to influence the plant's natural rhythm. Plant growth regulators can also promote or inhibit tillering.

Of economic interest is for example the minimization of lodging in cereals, and the slowing down of grass growth on verges and lawns, thus reducing mowing frequency.

When prior art plant growth regulators are used for instance on cereals to compact the plant stem to reduce lodging, their action is poor.

We have now found that salts of the formula

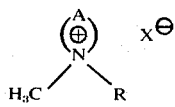

where R denotes methyl or ethyl, X denotes the anion of an inorganic or organic but not phytotoxic acid, preferably chloride or bromide, and A denotes a chain of four or five methylene groups, which chain may be substituted by chloro, bromo, methyl, chloromethyl, bromomethyl, hydroxymethyl and methylene, or which chain containing one or two double bonds, or A denotes the chain $—(CH_2)_n—NH—$, $n$ denoting one of the integers 3 and 4, are suitable for controlling growth in numerous plants, and particularly for reducing plant height. The action is better than that achieved by prior art plant growth regulators.

The salts may also be employed together with other plant protection agents, e.g., herbicides, insecticides, and especially fungicides. It is of significance in practice to use the salts together with fertilizers, particularly ureas.

The action of the compounds of the invention is particularly in evidence in cereals, e.g., wheat, rye, barley, rice and oats; dicotyledons, e.g., potatoes, tomatoes, vines and cotton; and various ornamentals, e.g., poinsettia and hibiscus. The treated plants exhibit a compact habit and darker leaf coloration.

The activity of the compounds is attributable to the cation, so that practically any anion may be used. However, anions of phytotoxic acids should not be employed if the intention is only to influence plant growth and not to kill the plants. Examples of suitable acids are hydrochloric acid, hydrobromic acid, sulfuric acid, carbonic acid, nitric acid, phosphoric acid, acetic acid, propionic acid, benzoic acid, monomethyl and monoethyl ester of sulfuric acid, 2-ethylhexanoic acid, acrylic acid, maleic acid, succinic acid, adipic added, formic acid, chloroacetic acid, p-toluenesulfonic acid, and benzenesulfonic acid.

The compounds may be applied to the plants through the soil, i.e., are taken up through the roots, or by spraying the plant leaves. In addition to soil and foilage application, the seed may be treated. As a result of the comparatively good crop plant compatibility, the application rate may vary considerably, rising for instance up to 15 kg of active ingredient per hectare. However, rates of 0.5 to 8 kg/ha are normally sufficient.

Examples of active salts are:
4-chloro-1,1-dimethylpiperidinium chloride [m.p. 230°C (decomposes)];
3-chloro-1,1-dimethylpiperidinium chloride [m.p. 245°C (decomposes)];
1,1-dimethylpiperidinium chloride (m.p. > 350°C)
1,1-dimethylpiperidinium bromide (m.p. 346°C from ethanol);
1,1-dimethylpiperidinium iodide [m.p. 350°C (decomposes)];
3,4-dehydro-1,1-dimethylpiperidinium chloride [m.p. 330°C (decomposes)];
3,4-dehydro-1,1-dimethylpiperidinium bromide (m.p. > 300°C);
3,4-dehydro-1,1-dimethylpiperidinium iodide [m.p. 274° to 275°C (decomposes)];
1,1,2-trimethylpiperidinium chloride;
1,1,2,6-tetramethylpiperidinium chloride;
1,1,3-trimethylpiperidinium chloride;
cis-2,6-dimethyl-1,1-dimethylpiperidinium iodide (m.p. 275°C);
2-hydroxymethyl-1,1-dimethylpiperidinium chloride [m.p. 288°C (decomposes)];
1-methyl-1-ethylpiperidinium chloride;
1-methyl-1-ethylpiperidinium iodide (m.p. 325°C);
1,1-dimethylpiperidinium methosulfate (m.p. 112°C);
1,2-dihydro-1,1-dimethylpyridinium bromide [m.p. 167° to 170°C (decomposes)];
1,1-dimethylpyrrolidinium chloride;
1,1-dimethylpyrrolidinium bromide (m.p. 342°C from ethanol);
2-methyl-1,1-dimethylpyrrolidinium chloride (m.p. 217°C);
2-bromomethyl-1,1-dimethylpyrrolidinium chloride [m.p. 224° to 225°C (decomposes)];
3,4-dehydro-1,1-dimethylpyrrolidinium iodide [m.p. 286°C (decomposes)];
1-methyl-1-ethylpyrrolidinium chloride [m.p. 284°C (decomposes)];
1-methyl-1-ethylpyrrolidinium iodide [m.p. 335°C (decomposes)].

All the compounds are hygroscopic solids having a high melting point of little sharpness since it usually rises as the water content of the compounds drops.

The salts are in general well-known. Some references are given below which describe the preparation of some of these salts:

R. R. Renshaw et al., J. Am. Chem. Soc., 60, 745 (1938); ibid. 61, 638 (1939)

R. Willstätter, Chem. Ber., 33, 365 (1900)

E. Wedekind and R. Oechslen, Chem. Ber., 35, 1076 (1902)

F. Weygand and H. Daniel, Chem. Ber., 94, 1688 (1961)

R. Lukes and Z. Vesely, Coll. Czech. Chem. Commun., 22, 638 (1957)

J. V. Braun and W. Teuffert, Chem. Ber., 61, 1092 (1928)
C. Mannich, Archiv Pharm., 272, 323 (1934)
G. L. Ciamician and M. Dennstedt, Chem. Ber., 16, 1542 (1883)
M. Saunders and E. H. Gold, J. Am. Chem. Soc., 88, 3376 (1966)

The salts may be obtained in a very simple manner by reacting a tertiary cyclic amine with an alkyl halide or dialkyl sulfate in an inert solvent in accordance with the following reaction scheme:

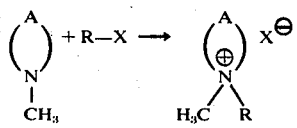

The preparation of some salts by various methods is illustrated below:

EXAMPLE 1

17 parts (by weight) of 4-chloro-1-methylpiperidine is dissolved in 150 parts of absolute ether and 40 parts of a 5N methyl bromide solution in acetonitrile is then added. After 4 hours the precipitate is suction filtered; there is obtained 22 parts of 4-chloro-1,1-dimethylpiperidinium bromide melting at 295°C (decomposes).

EXAMPLE 2

19.3 parts of 1,1-dimethyl-1,2,3,6-tetrahydropyridazinium bromide is dissolved in 50 parts of methanol and hydrogenated with 1.5 parts of palladium on carbon in a rotary bomb at room temperature and a hydrogen pressure of 20 atmospheres gauge. The catalyst is then removed by filtration and the solution evaporated to dryness. There is obtained 15 parts of 1,1-dimethylhexahydropyridazinium bromide melting at 250°C (decomposes).

EXAMPLE 3

19.4 parts of 1,1-dimethylpiperidinium bromide is dissolved in 60 parts of water and stirred with 40 parts of silver chloride for 30 minutes at room temperature. The mixture is subsequently filtered and the filtrate evaporated in vacuo. The residue is washed with acetone and ether and dried. There is obtained 13.5 parts of 1,1-dimethylpiperidinium chloride melting at > 350°C.

The agents according to the invention may be used as solutions, emulsions, suspensions, granules or dusts. The form of application depends entirely on the purpose for which the agents are being used; in any case it should ensure a fine distribution of the active ingredient.

For the preparation of solutions to be sprayed direct, the solution in water is suitable. However, dispersions in hydrocarbons having boiling points higher than 150°C, e.g. tetrahydronaphthalene or alkylated naphthalenes, or organic liquids having boiling points higher than 150°C and having one or more than one functional group, e.g. the keto group, the ether group, the ester group or the amide group, this group or these groups being attached as substituent(s) to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g., kieselguhr, talc, clay or fertilizers. If the agents of the invention are used in granular form, it is preferred to mix them with fertilizers.

The biological activity of some of the compounds of the invention is illustrated below:

EXAMPLE 4

Wheat grains of the "Opal" variety were sowed in loamy sandy soil in Neubauer dishes (diameter: 12 cm). Immediately after sowing the soil was treated with 3 mg and 6 mg per dish, equivalent to application rates of 3 and 6 kg/hectare. The active ingredients were sprayed in aqueous solution onto the soil surface. For comparison purposes there were used: an untreated control dish, and dishes treated at the same application rates with chlorocholine chloride (CCC), and 1-(β-chloroethyl)-1,1-dimethylhydrazinium chloride (CMH). The experiment was carried out under greenhouse conditions, and the following results were obtained after 20 days:

| Active ingredient | Relative growth height | |
|---|---|---|
| | 3 mg/dish | 6 mg/dish |
| Control (untreated) | 100 | 100 |
| CCC | 88 | 85 |
| CMH | 92 | 86 |
| 1,1-dimethyl-3,4-dehydropiperidinium bromide | 85 | 85 |

These results show that the active ingredient of the invention has a better action than CCC at the lower application rate. This superior action to CCC is also in evidence on other cereals, as is demonstrated by the following examples.

EXAMPLE 5

The active ingredients were tested on barley of the "Breuns-Wisa" variety under the same conditions as in Example 4. The treatment here, however, was carried out at application rates of 1.5 mg, 3 mg and 6 mg per dish, at a growth height of the plants of 10 cm. The following table shows the influence on growth after 6 days:

| Active ingredient | Relative growth height | | |
|---|---|---|---|
| | 1.5 mg/dish | 3 mg/dish | 6 mg/dish |
| Control (untreated) | 100 | 100 | 100 |
| CCC | 93 | 91 | 94 |
| CMH | 89 | 91 | 87 |
| 4-chloro-1,1-dimethyl-piperidinium bromide | 89 | 89 | 87 |
| 1,1-dimethyl-3,4-dehydro-piperidinium bromide | 85 | 79 | 83 |

EXAMPLE 6

A further experiment was carried out under the conditions of Example 4 on rye of the "Petkuser" variety. The soil in the dishes was treated with 3 mg, 6 mg and 12 mg per dish, corresponding to application rates of 3, 6 and 12 kg per hectare. The following results were obtained 20 days after treatment.

| Active ingredient | Relative growth height | | |
|---|---|---|---|
| | 3 mg/dish | 6 mg/dish | 12 mg/dish |
| Control (untreated) | 100 | 100 | 100 |
| CCC | 88 | 89 | 88 |
| CMH | 88 | 88 | 85 |
| 1,1-dimethyl-3,4-dehydro-piperidinium bromide | 84 | 82 | 84 |

EXAMPLE 7

The active ingredients were tested under the same conditions as in Examples 4 and 6 on oats of the "Flaemingskrone" variety. The application rates were 1.5 mg, 3 mg and 12 mg per dish, corresponding to 1.5, 3 and 12 kg per hectare. 20 days after treatment the following results were obtained:

| Active ingredient | Relative growth height | | |
|---|---|---|---|
| | 1.5 mg/dish | 3 mg/dish | 12 mg/dish |
| Control (untreated) | 100 | 100 | 100 |
| CCC | 97 | 94 | 87 |
| 4-chloro-1,1-dimethyl-piperidinium bromide | 92 | 94 | 87 |
| 1,1-dimethyl-3,4-dehydro-piperidinium bromide | 94 | 92 | 79 |

EXAMPLE 8

Potato plants of the "Tasso" variety (second early crop) were tested at a growth height of 8 to 15 cm. The active ingredients were sprayed at application rates of 1.5 kg per hectare and 6 kg per hectare. The following results were obtained after 2 weeks:

| Active ingredient | Relative growth height | |
|---|---|---|
| | 1.5 kg/ha | 6 kg/ha |
| Control (untreated) | 100 | 100 |
| CCC | 97 | 93 |
| 4-chloro-1,1-dimethylpiperidinium bromide | 97 | 89 |
| 1,1-dimethyl-3,4-dehydropiperidinium bromide | 86 | 65 |

EXAMPLE 9

The procedure of Example 4 was adopted in an experiment with barley ("Breuns-Wisa" variety). The action of 1,1-dimethylhexahydropyridazinium bromide was compared with that of CCC at application rates of 3 and 12 mg per dish, corresponding to 3 and 12 kg per hectare. The compounds were applied immediately after the barley had been sowed. Three weeks after treatment the following results were obtained; as is apparent, the action of 1,1-dimethylhexahydropyridazinium bromide caused a much greater reduction in plant height than the prior art compound CCC.

| Active ingredient | Relative growth height | |
|---|---|---|
| | 3 mg/dish | 12 mg/dish |
| Control (untreated) | 100 | 100 |
| CCC | 90 | 82 |
| 1,1-dimethylhexahydropyridazinium bromide | 87 | 72 |

We claim:

1. A process for stunting crop plant growth which comprises applying to the host soil for said crop plants a plant growth stunting amount in the range of 0.5 to 8 kg. per hectare of a member selected from the group consisting of 1,1-dimethyl-3,4-dehydropiperidinium bromide, 4-chloro-1,1-dimethylpiperidinium bromide, 1,1-dimethylhexahydropyridazinium bromide, and 1,1-dimethylpiperidinium chloride.

2. A process for stunting crop plant growth which comprises applying to the crop plants themselves a plant growth stunting amount in the range of 0.5 to 8 kg. per hectare of a member selected from the group consisting of 1,1-dimethyl-3,4-dehydropiperidinium bromide, 4-chloro-1,1-dimethylpiperidinium bromide, 1,1-dimethylhexahydropyridazinium bromide, and 1,1-dimethylpiperidinium chloride.

* * * * *